United States Patent [19]

Chapman

[11] 4,371,106
[45] Feb. 1, 1983

[54] METHOD OF AND STAND FOR DISASSEMBLING STRUCTURES SUCH AS RADIATORS

[76] Inventor: Robert M. Chapman, R. D. 1, Box 1040, Mohnton, Pa. 19540

[21] Appl. No.: 197,153

[22] Filed: Oct. 15, 1980

[51] Int. Cl.³ ............................. B23K 3/04; B23K 1/18
[52] U.S. Cl. ........................................ 228/19; 269/46; 29/726; 432/225; 432/231
[58] Field of Search .................... 228/19, 264; 29/726, 29/764; 432/225, 231; 269/46

[56] References Cited

U.S. PATENT DOCUMENTS

| | | | |
|---|---|---|---|
| 1,410,410 | 3/1922 | Schulz | 29/726 |
| 2,161,578 | 6/1939 | Johnson | 269/46 X |
| 2,789,194 | 4/1957 | Gosmann | 29/762 X |
| 3,149,825 | 9/1964 | Watkins | 29/726 X |
| 3,246,973 | 4/1966 | Bange et al. | 228/119 X |
| 3,644,980 | 2/1972 | Class, Jr. et al. | 29/762 X |
| 3,727,286 | 4/1973 | Kimmett | 29/764 |
| 4,324,393 | 4/1982 | Chausse | 269/46 |

Primary Examiner—Kenneth J. Ramsey
Attorney, Agent, or Firm—Antonelli, Terry & Wands

[57] ABSTRACT

A stand and method for disassembling structures, such as automobile radiators, by separation of first and second parts thereof that are joined by a meltable bonding medium such as solder. The disassembly stand is of a simple frame construction that is provided with an adjusting platform for raising, lowering, and supporting the structure to be separated and clamps for freely suspending the structure with its joint to be separated located so as to be acted upon by a room-shaped heating structure, according to a preferred embodiment. In accordance with an aspect of the method, opposed forces are caused to act upon the parts to be separated while the joint by which they are connected is simultaneously heated along substantially the entire length thereof.

10 Claims, 1 Drawing Figure

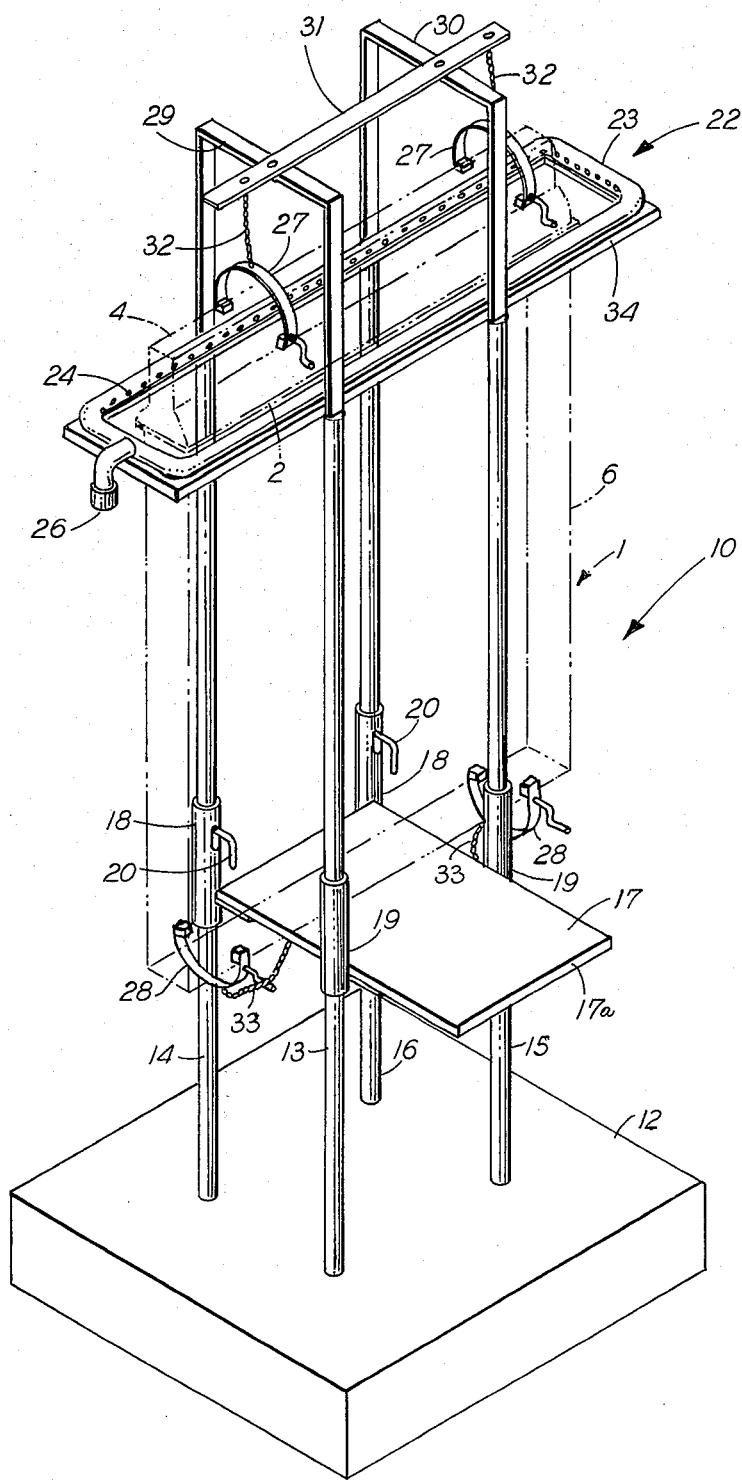

METHOD OF AND STAND FOR DISASSEMBLING STRUCTURES SUCH AS RADIATORS

BACKGROUND OF THE INVENTION

The present invention relates to a method and apparatus for the disassembly of parts of a structure that are joined together by a meltable bonding medium, such as automobile radiator manifolds and cores which are joined by solder.

Motor vehicle radiators typically are formed of a top distribution manifold and a heat transfer core which is joined in turn to a bottom collection manifold, the manifolds being joined to the core by soldered joints. Over a period of time, the core can become plugged or corroded or both, and if it cannot be repaired, it must be replaced. To avoid replacement, it is common practice to disassemble the radiator by application of heat to the joints between the cores and the manifolds so that the manifolds can be separated from the core, which then can be cleaned out or repaired as appropriate, after which the radiator is reassembled.

Disassembly of a radiator requires application of sufficient heat to the soldered joint to melt the solder which, depending on the particular alloy used, has a melting point in a typical range of about 375 to about 550 degrees F. Radiator repair devices that can be used to melt the solder along the joints between the core and manifolds, and to separate the manifolds from the cores have been known for some time (for example, U.S. Pat. Nos. 1,410,410 and 3,149,825), but no such device has yet met with any wide degree of acceptance. While no particular reason for this lack of acceptance can be definitively set forth, it is believed that radiator disassembly stands as have been known heretofore have suffered from such deficiencies as being costly, cumbersome and time consuming to use. Disassembly of radiators without the use of a stand or disassembly drive, is fraught with the risk of injury because it generally requires sequential application of heat to sections of the joint, such as by a torch, until enough heat has been applied to melt or weaken all of the solder over the full length of the joint. A worker is thus required to hold an area that has been previously heated while heating a subsequent area with attendant possibilities of injury by burns.

Accordingly, it is an object of the present invention to provide a method for disassembly of structures such as radiators by separation of first and second parts thereof that are joined together by meltable bonding mediums such as solder. Another object is to provide for practice thereof, that can be utilized without major expenditures, will not be cumbersome or dangerous, and will minimize the amount of time and heat required for disassembly of structures such as automobile radiators.

SUMMARY OF THE INVENTION

In accordance with a preferred embodiment of the present invention, the above objects are achieved by the provision of a stand upon which a radiator can be mounted or suspended, means to apply heat substantially, directly along a major extent of the junction between the parts joined by the meltable bonding medium, and means for causing opposing forces to act upon the parts while the structure is mounted to the stand and the junction is heated. According to the method aspect of the invention, after mounting of the structure to the stand, substantially the entire junction is heated and the opposing forces are caused to act upon the first and second parts during the heating step to produce separation of said parts. In this regard, it has been found that the directing of heat to the joint while causing opposing forces to act upon the parts is instrumental in speeding up the disassembly process. That is it has been found that by application of such force during heating, the actual duration of the heating step can be noticeably shortened due to the fact that the joint, which heretofore had to be heated to at least 550 degrees F to actually melt the normal soft solder used in radiator work, can be separated at temperatures which range from about 260 to about 300 degrees F.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

The sole FIGURE of the drawings is a perspective view of a disassembly stand in accordance with a preferred embodiment of the invention.

DETAILED DESCRIPTION OF THE PREFERRED EMBODIMENTS

Initially, while the following description is made with reference to a stand and method for disassembling an automobile radiator 1, such is being made by way of example only. It should be apparent to those of ordinary skill in the art that the present invention is also applicable to the disassembly of other forms of heat exchangers or a wide range of other structures that have parts secured together at a joint that is fixed by a meltable bonding medium.

In the FIGURE, the radiator 1 (schematically illustrated in dot dash lines) is comprised of at least an upper manifold section 4 and a tube core section 6 joined thereto at a soldered joint 2. For disassembly of the radiator 1, a stand 10 is provided that includes a base 12 to which are attached a plurality of supporting columns 13–16 and which together form the basic frame thereof.

An adjustable platform 17 is carried by the frame 10 by way of sleeves 18, 19. In this regard, while the stand shown in the drawing is provided with two pairs of sleeves 18, 19, in practice, it has been found sufficient to merely cantilever the platform 17 from the columns 14, 16 by way of the sleeves 18. To secure the sleeves 18 (and with them the platform 17) at a desired height, the sleeves 18 are provided with spring-biased adjusting levers 20. The spring biased adjusting levers 20 are biased into a position engaging the sleeves 18 with the columns 14 and 16 by any conventional detent mechanism, but can be disengaged by gripping thereof so as to permit readjusting of the height of the platform for reasons noted in greater detail below. If sleeves 19 are provided, it is preferred that they not be provided with height adjusting levers since such would preclude a single person from actuating all levers at one time.

Mounted to the top of the support columns 13–16 is a support ring 34 upon which a heating loop identified generally by the numeral 22 is removably supported. For example, a loop which is 24 inches long may be used for small radiators ranging from about 18 to 22 inches wide, while other loops having other lengths and/or shapes may be easily interchanged on the stand to suit other sizes of radiators and/or differently configured structures having sheet metal joints joined by a meltable bonding medium. Any suitable releasable clamp or tie down means can be used to hold the desired gas ring 22 in place upon the ring support 34.

The particular loop 22 shown is a pipe assembly 23 containing a plurality of holes or jets 24, each of which is sized and placed about the extent of the loop 22 so as to provide efficient delivery of heat to joint 2. For example, in a gas fired loop 22 such as that shown in the figure, the holes or jets 24 may be designed to deliver less heat along the longitudinal extent of joint 2 than at the ends thereof since the loop is closer in proximity at such extent than at the ends. The loop 22 shown is fed a combustible gas, alone or mixed with air, by way of an inlet pipe 26 that is connectible to any suitable supply of such a combustible medium. However, while the use of a gas-fired flame is preferred, it should be appreciated that electric radiant heat can be used and even radio frequency heat can be applied by way of a suitably modified heating loop. Likewise, while the support ring 34 is illustrated as an annular member of fixed size, it should be appreciated that a support ring can be utilized that is extensible in length so as to increase the range of heating loops and structures to be separated that can be mounted thereon or placed therewithin, respectively.

Mounted to the support ring 34 and rising thereabove, are a pair of supporting brackets 29, 30. Preferably, the brackets 29, 30, are located at the columns 13, 14 and 15, 16, respectively, as shown. These brackets serve not only for increasing the rigidity of the frame, but for carrying a suspension support 31, shown mounted to the top thereof and interconnecting same. Connected to the support 31 near the ends thereof (or at other suitable locations depending upon the nature of the structure to be disassembled) are suspension chains 32. Connected to the lower end of chains 32, are clamps 27. The clamps 27 can be of the shape illustrated that is suitable for gripping a radiator manifold, or can be of any other known clamping design suitable for clamping and suspending the particular structure to be disassembled.

The use of the aforedescribed stand in the practice of applicant's inventive method is as follows. With the adjustable platform 17 in a first, lowered position (not shown) the radiator 1 is placed onto the adjustable platform 17 whereupon the levers 20 are actuated so as to disengage the sleeves 18 from the columns 14, 16. The platform 17 is then adjusted to a second, raised position, wherein the peripheral joint 2 is placed within the optimum influence of heat produced by loop 22. Once the joint 22 is properly positioned, the levers 20 are released and the platform 17 fixed in said second position.

While the joint 2 could now be subjected to heating to an extent sufficient to cause all of the solder to melt and flow out of the joint 2, such is not within the practice of applicant's inventive method. In accordance with applicant's method, clamps 27 are secured to the upper radiator manifold and the platform 17 then lowered to a third, intermediate position (also not shown) between the above-noted first and second positions. This third position should only be sufficiently below the second, raised, position to enable the full weight of the radiator 1 to be borne by the clamps 27, and preferably sufficiently low enough to enable complete separation of the upper manifold 4 from the radiator core 6. If the disassembly stand 10 is provided with the optional lower clamps 28, these clamps are secured to the radiator core or lower radiator manifold prior to shifting of the platform to said third position.

The heating loop 22 is now actuated to apply heat simultaneously to substantially the entire junction 2. During heating of the joint 2, opposing forces are caused to act upon the upper manifold 4 and the remainder of the radiator 1 in one of several manners. Firstly, such forces can be created by the worker merely grasping the core 6 by hand and pulling downward thereon until such time as the core 6 separates from the manifold 4. Since the platform 17 is located only a slight distance below the radiator, the radiator manifold 4 remains held by the clamps 27 and the remainder of the radiator can come to rest upon the platform 17 without any great likelihood of damage thereto or injury to the worker.

If clamps 28 are utilized, then a downwardly directed force can be applied to the core by way of the platform 17 by means of the worker gripping the levers 20 so as to disengage the sleeves 18 and apply a downward force equal to that of the gravitational effect of the weight of the platform and sleeves. This force can be increased by the placing of additional weights upon the platform extension 17a. Once the manifold separates from the core, the levers 20 are immediately released locking the platform 17 in place so as to enable the separated core section to come to rest upon the platform and to prevent the platform and core from dropping any appreciable distance toward the base 12. Additionally, in many instances sufficient opposing forces can be caused to act upon the manifold and core in a manner producing separation thereof at a temperature below the melting point of the bonding solder joining same together at joint 2 simply as a result of the gravitational forces produced by the weight of the core 6 on the joint 2 due to the free suspension thereof, an opposite reaction force being applied to the other side of the junction 2 by the damping arrangement.

Once the manifold and core are separated, the manifold 4 can be removed from the clamps 27 and the core section 6 removed from the platform 17 in order to perform the necessary repairs, or if a lower manifold is present upon the core and repair work requires removal thereof, the core can be inverted and replaced upon the platform for the purpose of separation thereof from the lower manifold in accordance with the steps set forth above.

As has been previously mentioned, when heat is simultaneously applied to substantially the entire extent of the solder joint while opposing forces are applied thereto, it is possible to disassemble the parts without completely melting all of the solder, or at least without requiring that all of the solder flow out of the joint. Substantial savings of time and heating expense accrue from this aspect of the invention. While this may result in one or both of the joint parts needing to be cleaned of solder before the part can be reused, such solder is easily removed after disassembly of the parts, while parts that are to be discarded need not have the remaining solder removed at all.

From the foregoing descriptions, it should be apparent that the present invention provides a disassembly stand that will be easy and simple to construct, and simple and safe to use in disassembling of structures, such as radiators, by separation of their parts that are joined together by meltable bonding mediums such as solder. Furthermore, it should also be understood how applicant's disassembly stand is useful in the practice of the disclosed method, which method of disassembly results in the simple, safe, inexpensive, and less time consuming disassembly of automobile radiator manifolds and the like, from each other than has heretofore been possible.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A disassembly stand for disassembling a structure by separation of first and second parts that are joined together by a meltable bonding medium comprising: (A) a frame; (B) heating means mounted to said frame and configured to substantially simultaneously direct heat along a major extent of a junction between said first and second parts; (C) suspension means carried by said frame for suspending said structure by said first part with said junction in alignment with said heating means; and (D) means for causing opposing forces to act upon first and second parts while said structure is suspended by said suspension means and the junction heated, wherein said means for causing comprises a vertically adjustable platform means for receiving said structure in a first, lower position, for supporting said structure during mounting thereof to said suspension means in a second, raised position, and for shifting the weight of said structure to said suspension means in a third, intermediate position between said first and second positions.

2. A disassembly stand according to claim 1, wherein said suspension means comprise a plurality of radiator manifold clamps.

3. A disassembly stand according to claim 2, wherein said heating means comprises a plurality of differently configured interchangeable heating loops, each respective one of which is selectively mountable to said frame, thereby adapting said stand for use in disassembling structures of differing sides and shapes.

4. A disassembly stand according to claim 1 or 2, wherein said platform is operable to limit relative movement between said first and second parts in said third position.

5. A disassembly stand according to claim 1 or 2, wherein said platform is operable to apply a downward force to said structure during movement from said second position toward said first position.

6. A disassembly stand according to claim 5, comprising radiator core clamps connected to said platform for transmitting said downward force to said structure from said platform.

7. A disassembly stand according to claim 16, wherein said platform is provided with a weight receiving extension for receiving weights for increasing said downward force.

8. A disassembly stand according to claim 1 or 2, wherein said platform is provided with height adjusting levers for raising and lowering said platform and for securing said platform to said frame at and between said positions.

9. A disassembly stand according to claim 1, wherein heating means is a burner ring.

10. A disassembly stand according to claim 1 or 9, wherein said heating means comprises a plurality of differently configured interchangeable heating loops, each respective one of which is selectively mountable to said frame, thereby adapting said stand for use in disassembling structure of differing sizes and shapes.

* * * * *